Sept. 12, 1961     D. D. DUESENBERG     2,999,492
VALVE STEM SEAL
Filed June 15, 1960

D. D. DUESENBERG
INVENTOR.

BY J. R. Faulkner
T. H. Oster

ATTORNEYS

United States Patent Office 2,999,492
Patented Sept. 12, 1961

2,999,492
VALVE STEM SEAL
Denny D. Duesenberg, Grosse Ile, Mich., assignor to Ford Motor Company, Dearborn, Mich., a corporation of Delaware
Filed June 15, 1960, Ser. No. 36,207
7 Claims. (Cl. 123—188)

This invention is concerned with the valve gear of an internal combustion engine and more specifically with a means for controlling leakage of fuel or lubricant between the poppet valve stem and the valve guide.

Leakage of fuel or lubricant between the poppet valve stem and the valve guide can result in dilution of the lubricant between the poppet valve stem and the valve guide by the fuel or sticking of the valve in the valve guide due to the carbonization of excess oil leaking between these two members. Attempts to solve this problem have taken many forms including, but not limited to those of the umbrella type metal and/or elastomer seals frictionally or rigidly secured to the valve stem that prevent direct and excessive wetting of the valve stem by the engine lubricant.

It is the primary object of this invention to provide poppet valve sealing means in the form of a simple, dependable and inexpensive metal umbrella seal and elastomer member combination to prevent direct wetting of the poppet valve stem.

Another object of this invention is to provide simple, dependable and inexpensive means for locking the umbrella seal and elastomer member to the poppet valve.

Figure 1:
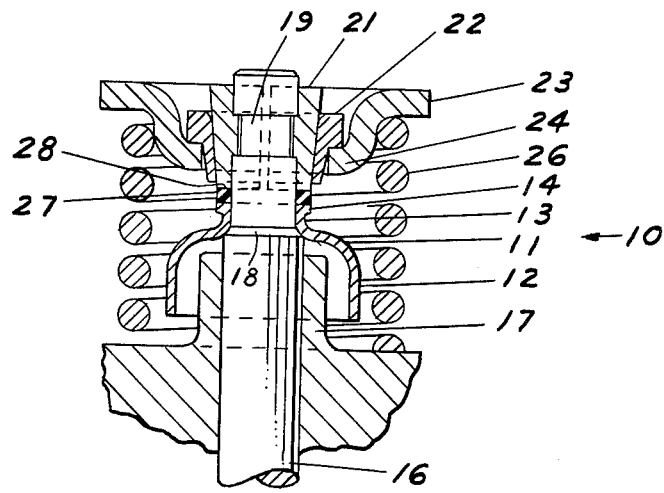
Figure 2:
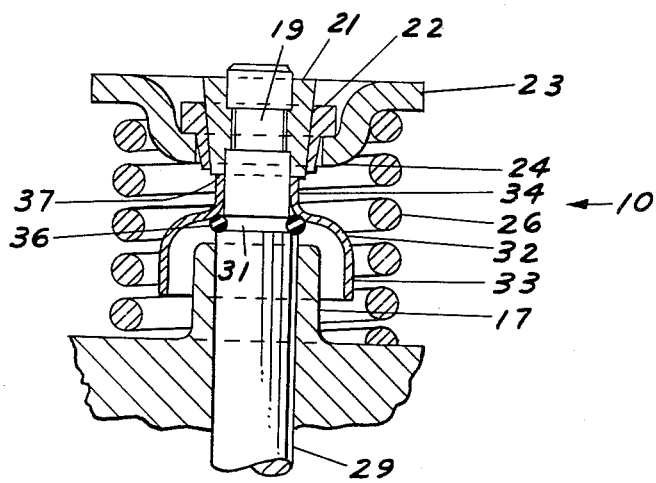

The construction of this seal is best understood by reference to the two figures of drawings in which:

FIGURE 1 is a vertical sectional view of a portion of the valve gear incorporating the invention; and FIGURE 2 is a vertical sectional view similar to FIGURE 1 of a portion of the valve gear and incorporating an alternate form of the invention.

Referring now to the drawings, a fragmentary portion of an internal combustion valve gear is indicated generally at 10. An umbrella seal fabricated from a lightweight metal such as aluminum and its alloys or out of a light gage steel is indicated at 11. Umbrella seal 11 is provided with a depending flared skirt 12 that is integral with a base portion 13. Base 13 has a radially extending flange 14.

A poppet valve 16 is slidingly received in a valve guide 17. Poppet valve 16 is reduced in diameter at the foot portion to define step 18 and the usual valve stem groove 19 disposed in the reduced diameter portion medially between the end of the poppet valve and the step 18. Valve spring retaining means are provided in the form of valve locks 21, sleeve 22 and valve spring retainer 23. Valve locks 21 are maintained in engagement with the valve stem groove 19 by a cylindrical sleeve 22. Valve spring retainer 23, which is provided with an apertured depression 24 through which a portion of the sleeve extends, receives the free end of the valve spring 26. The valve spring retaining means heretofore described is conventional and has been used for a number of years in automotive vehicle engine applications.

In FIGURE 1 effective prevention of the wetting of the poppet valve is accomplished by sliding the umbrella seal 11 over the end of the poppet valve so that the base portion 13 bottoms against the step 18. A washer 27 having elastomeric properties is then placed over the poppet valve to engage the radially extending flange 14 of the umbrella seal 11. The valve spring retaining means are then assembled and locked to the valve stem groove 19. It will be noted that upon assembly to the valve stem groove 19, the lower edge 28 of the valve locks 21 contact and deform the washer 27 so that the washer material will flow in positive surface engagement about the poppet valve and the radially extending flange 14 of the umbrella seal thereby preventing the leakage of oil from the top of the spring retaining means down the poppet valve stem.

Referring now to FIGURE 2 of the drawings, which illustrate an alternate embodiment, poppet valve 29 is reduced in diameter at the foot portion which terminates in an annular groove 31. An O ring 36 having elastomeric properties is nested in the groove 31 so that it will be snugly received in the groove. The umbrella seal 32 is similar to the umbrella seal 11 and has the dependent flared skirt 33 integral with the anular base 34. After the O ring 36 has been positioned in the groove 31, the umbrella seal is placed on the poppet valve and is in contact on the underside with the O ring. The valve spring retaining means are assembled and locked to the valve stem groove 19. When this assembly takes place, the lower edge 28 of the valve lock 21 will contact the edge 37 of the base 34 and will force the umbrella seal 32 downward to distort the O ring 36 in secure sealing relationship between the underside of the umbrella seal 34 and annular groove 31.

It will be understood that the invention is not to be limited to the exact construction shown and disclosed, but that various changes and modifications may be made without departing from the spirit and scope of the invention, as defined in the appended claims.

I claim:

1. An internal combustion engine valve gear comprising a poppet valve, a seal positioned upon said poppet valve, a member having elastomeric properties disposed about the poppet valve and in contact with a portion of the seal, means detachably engaging the poppet valve to spring load the poppet valve, said means contacting one of said seal and said elastomeric member when said means are detachably engaged to the poppet valve, said means and said seal being so figured that the elastomeric member is compressed in sealing engagement with the poppet valve and the seal when the means are detachably engaged to the poppet valve.

2. An internal combustion engine valve gear comprising a poppet valve, an umbrella seal engaging the poppet valve stem and substantially restricted from moving axially along the stem in one direction, a member having elastomeric properties on said valve stem and contacting a portion of the umbrella seal, said poppet valve having an annular groove at one end, valve spring retaining means detachably mounted in the poppet valve stem groove, said valve spring retaining means being in contact with one of said umbrella seal and said elastomeric member when said valve spring retaining means are detachably mounted in the poppet valve stem groove, said spring retaining means and said umbrella seal being so figured that the elastomeric member is compressed in sealing engagement with the poppet valve and the umbrella seal when the valve spring retaining means are detachably engaged in the poppet valve stem groove.

3. In a poppet valve seal means for overhead valves, in combination with a vertically movable poppet valve and a stationary valve guide, an umbrella seal on said poppet valve above said guide, said poppet valve having a reduced portion and a valve stem groove disposed medially in said reduced portion, said reduced portion and said valve stem groove being disposed above the valve guide throughout the poppet valve cycle, said poppet valve seal having a base section and an integrally formed dependent flared skirt, said base section being disposed on said poppet valve reduced diameter portion, an elastomeric member disposed on said poppet valve and in contact with the umbrella seal, a pair of valve locks detachably engaging the poppet valve stem groove, means holding said valve locks in said poppet valve stem groove, said poppet valve stem groove and the end of the reduced diameter portion being so figured that the distance between the valve stem groove and the end of the reduced diameter portion is less than the distance occupied by the valve stem locks, the umbrella seal base portion and the uncompressed elastomeric member.

4. An internal combustion engine valve gear comprising a poppet valve having a reduced diameter portion defining a step, an umbrella seal having a base portion and an integral depending flared skirt disposed on said poppet valve so that the base portion of the seal engages the step, a washer having elastomeric properties disposed on said poppet valve and engaging the base portion of the umbrella seal, and valve lock means disposed in a groove in said poppet valve stem and effectively compressing said washer to seal the base portion of the umbrella seal to the poppet valve.

5. The structure defined by claim 4 which is further characterized in that said base portion has a radially extending flange with said washer in contact with said radially extending flange, said valve stem groove and said step being so figured that the distance between said valve stem groove and step is less than the distance occupied by the base portion, the valve lock means and the washer in the uncompressed state.

6. An internal combustion engine valve gear comprising a poppet valve having a reduced diameter portion terminating in an annular groove and a poppet valve stem groove in the reduced diameter portion intermediate the end of the poppet valve and the annular groove, a member having elastomeric properties disposed in said annular groove, an umbrella seal having a base portion and a depending flared skirt disposed over said elastomeric member, and valve lock means disposed in said poppet valve stem groove abutting the base portion of said umbrella seal.

7. The structure defined by claim 6 which is further characterized in that said elastomeric member comprises an O ring snugly fitting in said annular groove, said poppet valve stem groove and said annular groove being so figured that the distance between them is less than the distance occupied by the umbrella seal base portion, the valve lock means and the O ring in the uncompressed state.

References Cited in the file of this patent

UNITED STATES PATENTS

| 1,711,267 | Hutt | Apr. 30, 1929 |
| 2,124,702 | Jacoby | July 26, 1938 |
| 2,822,796 | Niess | Feb. 11, 1958 |

FOREIGN PATENTS

| 270,180 | Great Britain | May 5, 1927 |